United States Patent [19]

Hoglund

[11] 4,138,926
[45] Feb. 13, 1979

[54] APPARATUS FOR REMOVING MACHINING BURRS

[75] Inventor: Nils O. Hoglund, Berkeley Heights, N.J.

[73] Assignee: Hoglund Tri-Ordinate Corporation, Berkeley Heights, N.J.

[21] Appl. No.: 828,820

[22] Filed: Aug. 29, 1977

[51] Int. Cl.² .................................................. B23D 5/00
[52] U.S. Cl. ...................................... 90/24 A; 90/26; 90/52
[58] Field of Search ................... 90/24 A, 24 C, 24 F, 90/24 R, 24.3, 26, 31, 52

[56] References Cited

U.S. PATENT DOCUMENTS

| | | | |
|---|---|---|---|
| 2,602,378 | 7/1952 | Morton | 90/52 |
| 2,679,293 | 5/1954 | Garrison | 90/24 R X |
| 3,183,784 | 5/1965 | Cudini | 90/24 A |
| 3,512,450 | 5/1970 | Portal | 90/31 X |

FOREIGN PATENT DOCUMENTS

563292  5/1957  Italy .................................... 90/52

Primary Examiner—Gil Weidenfeld
Attorney, Agent, or Firm—Pennie & Edmonds

[57] ABSTRACT

Disclosed is a deburring apparatus having a tool holder mounted on a mechanism which moves the holder along a path corresponding to the nominal contour of the edge of a cut such as a groove or slot in the work piece to be deburred. A deburring tool is mounted in the tool holder for movement toward and away from the edge to be deburred and is resiliently biased toward the edge so that it automatically follows the cut and removes the burr therefrom despite variations of the edge being deburred from its nominal location.

27 Claims, 13 Drawing Figures

APPARATUS FOR REMOVING MACHINING BURRS

BACKGROUND OF THE INVENTION

The invention pertains to an apparatus for automatically removing machining burrs from a previously machined article.

Machining of metal parts by cutting tools such as milling cutters, machine drills, boring tools and the like, produces burrs at the edges of the cut where the cutting tool enters and leaves the surface of the metal. Removal of the burrs has caused a great deal of problems, particularly in automated metal working transfer machines in which a variety of machining operations are performed on the metal part at a number of different work stations. Because of tolerance build up and inaccuracies in the various cutting operations carried out on such a machine, there is considerable variation between the actual and nominal, or design, location of a given cut, such as a groove or slot in the surface of the part. For that reason the precise position of the edge to be deburred can not be predicted with sufficient accuracy for the burrs to be removed by conventional automated metal working machines without damage to the adjacent surfaces. Various other methods for removing the burrs have been tried without much success. An attempt has been made, for example, to remove the burrs by means of electrolytic machinery in which the electrode was used to burn out or unplate the burr from the machined part. Because of the cost of the electrodes and the short life of the equipment, this method, however, was found to be too costly to be practical. A number of other deburring methods, such as heating to high temperatures by electrical discharge, chemical treatment, shot blasting and the like, have also been tried with equal lack of success. Since none of these methods proved to be practical or economical, the deburring operation has theretofore usually been performed manually.

Removal of burrs by hand in mass production of machine parts is, however, a very slow and expensive operation markedly increasing the cost of the product. Deburring, for example, is a serious problem and a major factor in the cost of fabricating diesel piston connecting rods. In the production of the connecting rods, all the machining operations are carried out on a single transfer machine having a number of work stations for cutting the lubricating channels and keeper slots in the wall of the journal bore, boring the journal and performing various other machining operations on the connecting rod as it is transferred from station to station. As the oil grooves and keeper slots are cut in the sides of the bore, in such a machining operation, burrs form at the edges and are pushed into the cuts during the subsequent boring of the journal. Since the burrs, if left in place, would interfere with the flow of the lubricating oil and the proper seating of the journal bearing, they must be removed at the end of the machining operation. The cost of removing the burrs, a process which is carried out by hand, is amply illustrated by the fact that although the transfer machine can be run by two or three operators, the manual removal of the burrs requires as many as twenty operators to keep up with the machine.

The object of this invention is to provide an automatic deburring machine capable of rapidly removing machining burrs from slots, grooves or other cuts in the surface of a work piece even though the cuts may deviate considerably from their nominal locations.

SUMMARY OF THE INVENTION

In accordance with the preferred embodiment of the invention, the deburring apparatus includes a tool holder which supports a burr removing tool for movement in two mutually perpendicular planes. The deburring tool is biased by resilient means such as a spring in one direction in one of the planes toward the edge to be deburred with sufficient force to remove the burrs without scoring the surface of the work piece. A second resilient means, such as a spring or a pair of springs maintains the cutting tip of the tool centralized in the first plane while allowing it to move in the second plane against the resistance of the springs.

The tool holder is attached to a tool supporting housing or head which is supported on a mounting mechanism for translational movement in at least two orthogonal directions, which will be referred to as the X and Y coordinates. Although the X and Y coordinates may, they need not necessarily lie in the horizontal plane. This arrangement thus permits the head, and the tool which it carries, to be moved in the plane of the X and Y coordinates along any given path corresponding to the nominal contour of the edge to be deburred. At the same time, since the deburring tool can move against the resistance of the biasing springs in two orthogonal planes, it automatically follows the groove, slot or other cut being deburred even if the cut departs from the design or nominal position.

Advantageously, the tool holder may include a support member or shank which is adapted to be demountably attached to the tool head and supports a movable member or carriage for translational movement in one of the planes. This may be accomplished by mounting the carriage for slidable movement on a pair of parallel guide pins attached to one end of the shank. The deburring tool is supported on the carriage for movement therewith and is biased outwardly from the longitudinal axis of the shank toward the surface to be deburred by a spring engaged between the shank and the carriage. Movement in the second plane is effected by mounting the deburring tool on the carriage for pivoting about an axis perpendicular to that plane, with the tool being biased by a pair of opposed springs so that its cutting tip lies in the first plane, i.e. in the plane of translational movement of the tool.

The mounting mechanism for supporting the tool head comprises a base and a first slide mounted on the base for translational movement in one of the two orthogonal directions, for example, along the X-coordinate. The head carrying the tool holder is mounted on a second slide which is supported on the first or X-slide for movement in the Y-coordinate. Advantageously, the movement of each slide may be controlled by a cam, such as a rotating plate cam, having a contour shaped to impart the desired movement to the associated slide.

The cams controlling the respective slides may be attached to a single shaft so that they rotate at precisely the same speed enabling the movement of the slides, and hence the movement of the tool head, to be controlled with a great degree of precision. In such an arrangement, the cam shaft is mounted on the X-slide and is rotationally driven by a motor affixed to the same slide. The cam contacts a cam follower supported on the base and is maintained in engagement with the follower by a hydraulic cylinder-piston device positioned between the X-slide and the base. Rotation of the cam thus causes the X-slide to move in the X-coordinate with respect to the base in a manner determined by the cam contour. Movement of the second or Y-slide is effected by a transfer slide mounted on the X-slide for movement in a direction parallel to the X-coordinate. A follower on the end of the transfer slide engages a ratio cam on the Y-slide which is arranged to drive the latter in the Y-coordinate as the transfer slide is moved toward or away from the Y-slide by a second plate cam affixed to the cam shaft. By shaping the cam contours to impart an appropriate movement to the associated slides, the tool head and the tool can thus be made to traverse any given path in the plane of the X and Y coordinates.

The orientation of the X-Y plane and two planes of movement of the tool in the tool holder depends on the shape of the work piece and the contour of the cut to be deburred. For example, in the case of a piston connecting rod having circumferential oil groove and keeper slots cut in the wall of the journal bore, the slides are arranged to move the head in the horizontal plane. The carriage carrying the tool is also supported on the shank for movement in the horizontal plane while the tool is mounted on the carriage for pivoting in the vertical plane with its cutting tip maintained in the horizontal plane by the pair of opposed springs. To use the apparatus, the tool holder is attached to the head and the piston connecting rod is clamped on a work stand beneath the head in a position such that the cuts to be deburred extend horizontally from the wall of the journal bore. The tool holder is then inserted into the journal bore of the connecting rod by lowering the head or raising the work stand and the head is moved horizontally until the cutting tip of the tool enters the start of the groove to be deburred.

The cams controlling the movement of the head are shaped to move the tool in the X and Y coordinates along a path corresponding to the nominal contour of the groove edge to be deburred. The spring engaged between the carriage carrying the tool and the shank of the tool holder biases the tool forwardly against the edge of the groove or slot with a force sufficient to remove the burr without scoring the adjacent surface. Thus, as the head is moved along a path corresponding to the nominal contour of the edge of the groove or slot by the rotation of the cams and movement of the associated slides, the tool follows the cut scrapping off the burr from its edges. Since the carriage carrying the tool is biased forwardly and can move back against the biasing spring, the tool is able to follow the edge of the cut despite deviations from its nominal location in the horizontal plane. Similarly, because the tool is pivotally supported on the carriage, the cutting tip can move up and down against the springs biasing the tool in a horizontal position and follow the slot even if it departs from its nominal position in the vertical plane.

When deburring cuts in a curved surface, such as oil grooves cut in the cylindrical wall of a bore in a connecting rod, the desired cutting angle between the tool and the edge being deburred is maintained by rotating the tool holder about the shank axis as the tool moves along the groove. This may be effected by attaching the tool holder to a shaft rotatably mounted in the tool head of the apparatus and rotating the shaft at a rate required to maintain the desired cutting angle during the deburring of the groove. Advantageously, the rotation of the shaft, and hence the tool holder, can also be controlled by a cam attached to the same cam shaft as the cams controlling the translational movement of the tool head. In such an arrangement, the cam drives a third slide supported on the Y-slide for translational movement in the X-coordinate. The third slide rotates the shaft carrying the tool holder by means of a gear train driven by a rack coupled to the slide. This construction enables the movement of the tool to be precisely controlled since the cams controlling both the rotation and translational movement are attached to the same shaft and therefore rotate at the same speed.

Because the deburring tool is mounted in the tool holder for movement in two orthogonal planes, and therefore automatically follows the edge being deburred regardless of deviations from the design location, the exact position of the actual cut need not be known for each article. Hence, the cams controlling the movement of the head can be fabricated to move the tool along a path corresponding to the nominal contour of the cut for any given article and can be used for removing the burrs for any number of such articles even though the cuts in each may vary because of machining inaccuracies. The apparatus of the invention is thus extremely flexible and can be used to deburr a wide variety of machined parts by simply changing the contours of the cams to accommodate the different cuts. Moreover, by mounting the head for movement in three orthogonal directions, the apparatus can be used to deburr grooves extending in all three dimensions. This may be easily done by attaching the head to a slide supported for vertical movement on the Y-slide and controlling its movement in the vertical direction by means of an additional plate cam, transfer slide and ratio cam for transforming the horizontal movement of the transfer slide to a vertical movement of the slide carrying the head.

DESCRIPTION OF THE PREFERRED EMBODIMENTS

Figure 1:
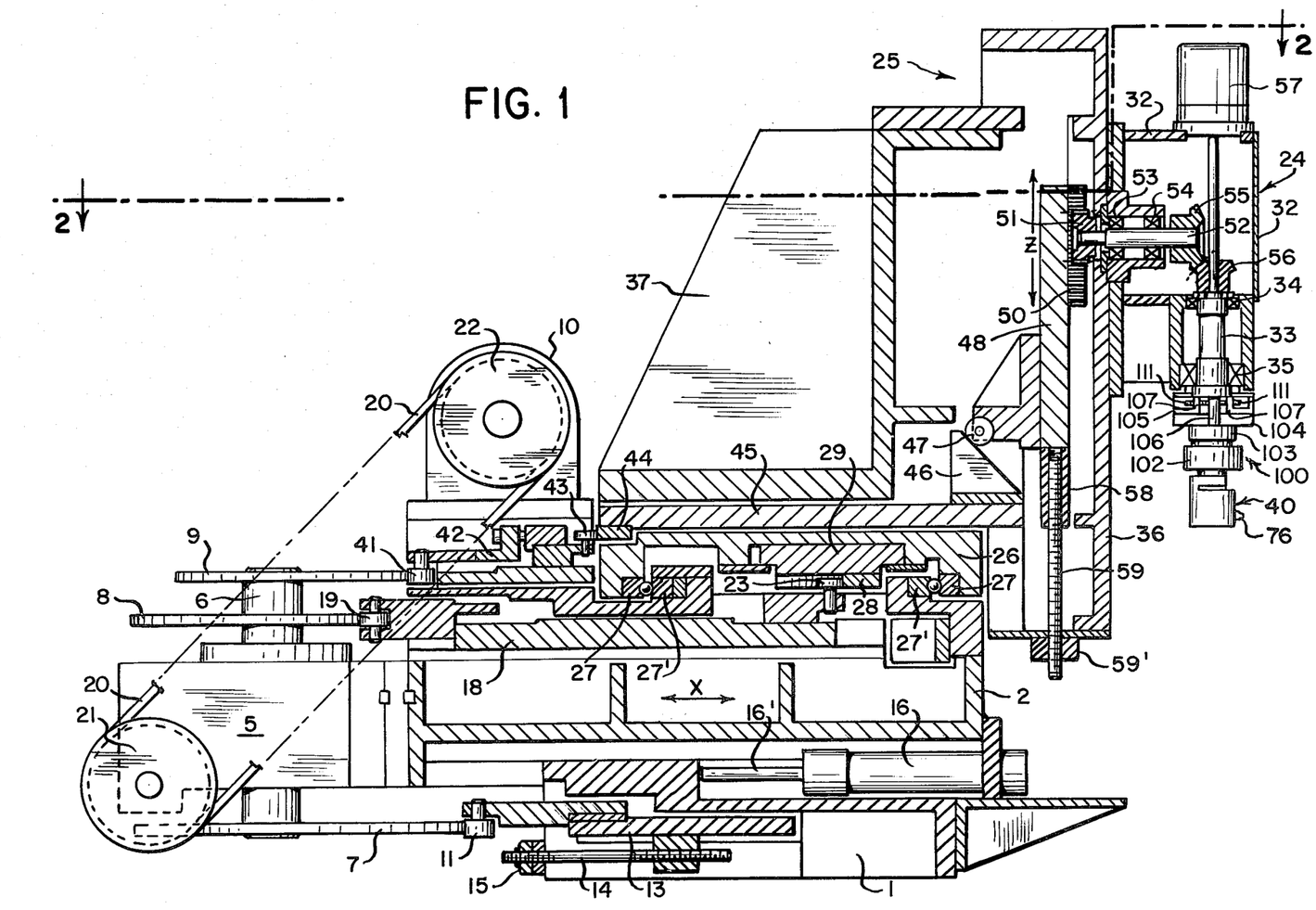
FIG. 1 is a cross-sectional view of the deburring apparatus of the invention taken along lines 1—1 of FIG. 2.
Figure 2:
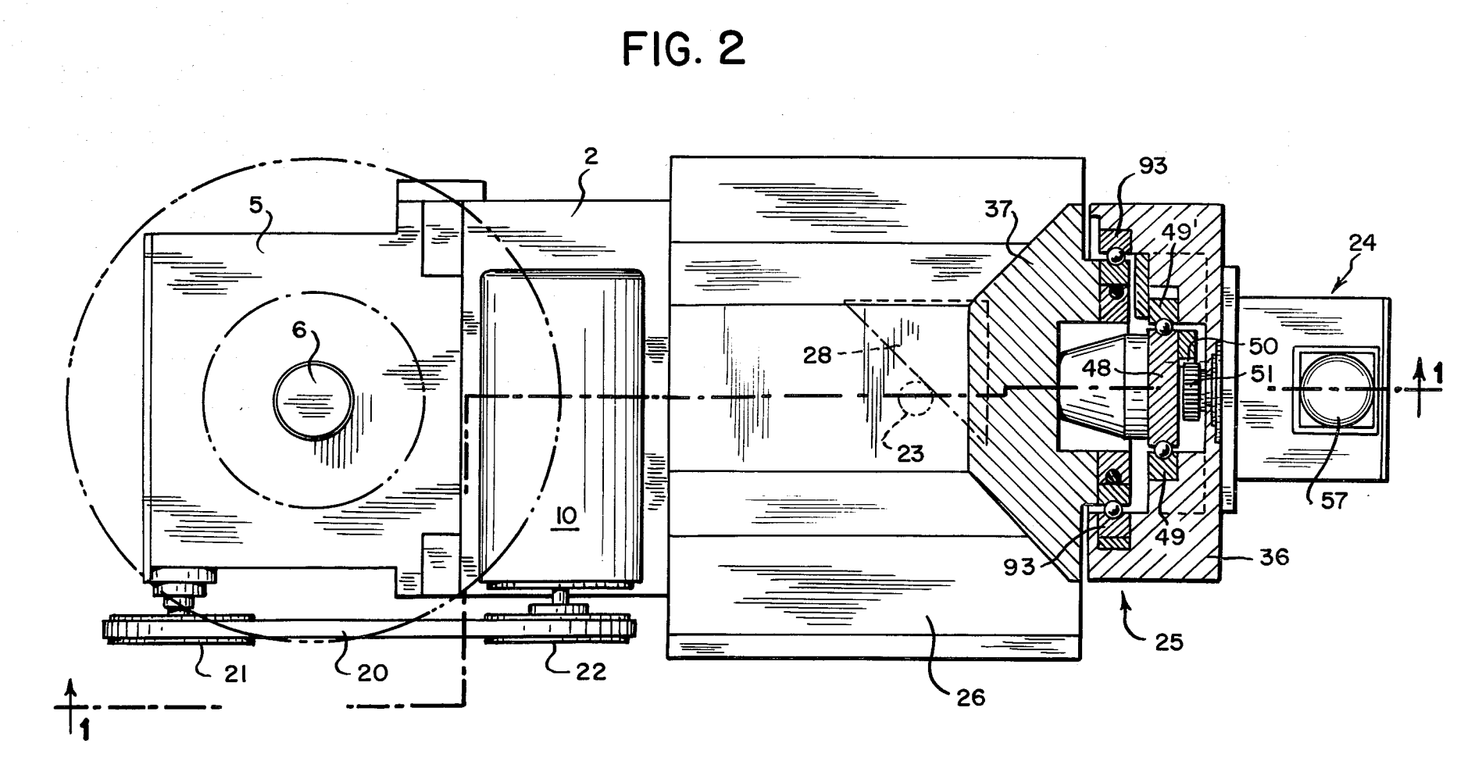
FIG. 2 is a partial cross-sectional plan view of the apparatus of the invention taken along lines 2—2 of FIG. 1.
Figure 3:
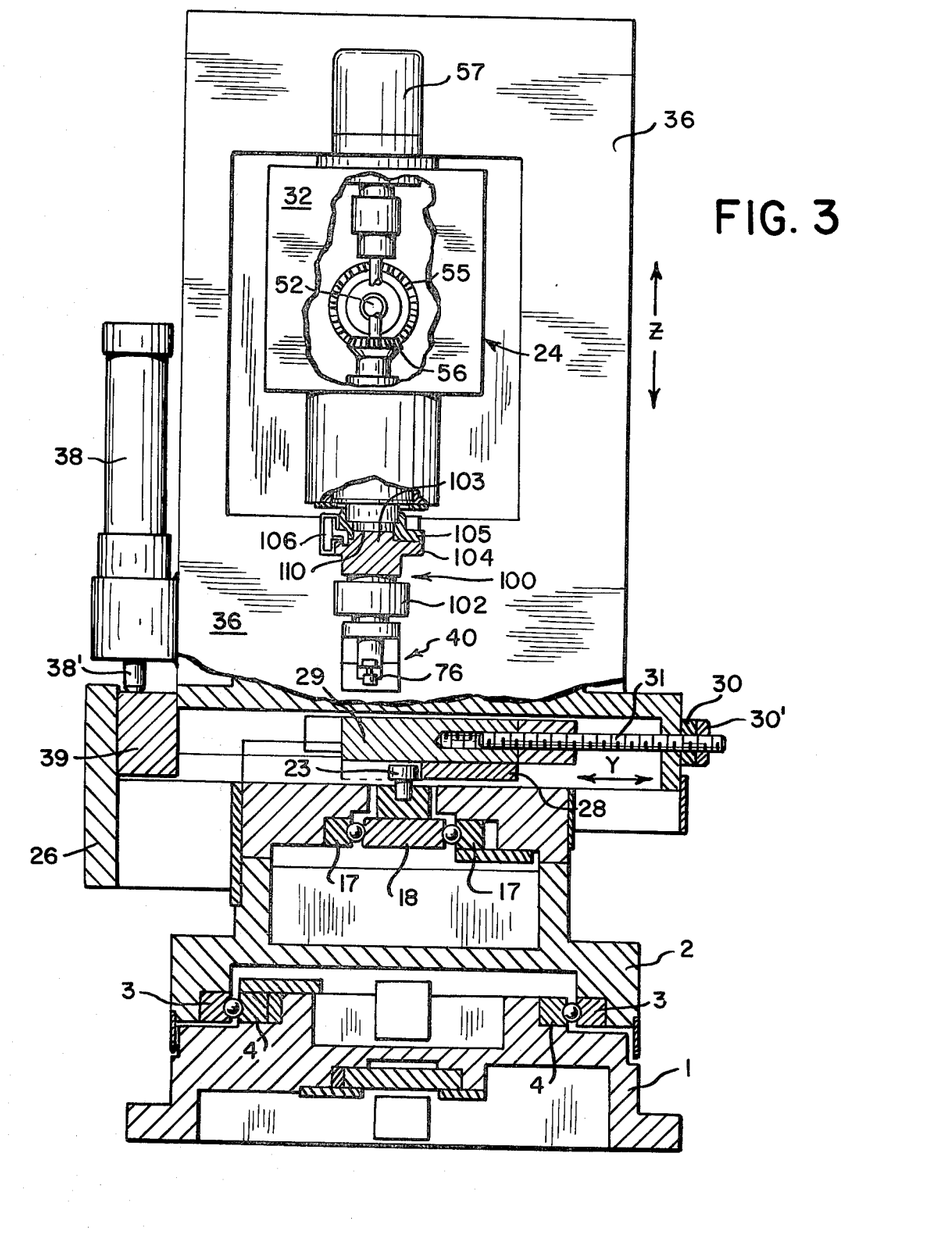
FIG. 3 is a partial cross-sectional elevation view of the apparatus of the invention.

Referring now to FIGS. 1 to 3, the deburring apparatus of the invention includes a base 1 on which is mounted a slide 2 for movement in the X direction or coordinate as indicated by the double ended arrow shown in FIG. 1. The slide is supported on the base 1 by a pair of parallel roller guides 3 (FIG. 3) which ride on roller guides 4 affixed to the base. Mounted on slide 2 is a gear box 5 containing a backlash-free gear system for rotating a shaft 6 to which are attached three spaced apart plate cams 7, 8 and 9. The gear system is driven, via belt 20 and pulleys 21 and 22, by a D.C. motor 10, which is also mounted on slide 2.

Movement of the slide 2 in the X-coordinate is controlled by cam 7 which engages a cam follower 11 supported on a subslide 13. The subslide is mounted on the base 1 for movement in the X-coordinate and its position with respect to the base is adjustable by means of nuts 15 on threaded rod 14 connected between the base and the subslide. A hydraulic cylinder 16 and piston rod 16' positioned between the slide 2 and the base 1 bias the slide to the right, as viewed in FIG. 1, to maintain the cam 7 in engagement with the follower 11. The initial position of the slide 2 with respect to the base, and hence with respect to the work piece, is adjusted in the X-coordinate by moving the subslide to the left or right, as viewed in FIG. 1, by means of nuts 15 and rod 14. Once this adjustment is made, the subslide is locked in position by tightening the nuts 15 against each other so that the slide 2 moves in the X-coordinate with respect to the subslide and base under the influence of the rotating cam 7.

The tool head, generally indicated at 24 in FIG. 1, and the head support assembly 25 are mounted on a second slide 26 supported on slide 2 for movement transversely of the latter. Attached to the bottom of the transverse slide 26 are a pair of roller guide rails 27 which ride on two-parallel guide rails 27' affixed to the top of slide 2 and extending perpendicularly to the guide rails 3. Slide 26, and the tool head 24 which it supports, thus moves along the guide rails 27' in the Y-coordinate, as indicated by the double headed arrow in FIG. 3.

Movement of slide 26 is controlled by cam 8 which engages a cam follower 19 on one end of a transfer slide 18. As shown in FIG. 3, the transfer slide 18 is supported on a pair of roller guides 17 affixed to the slide 2 so that it can move in the X direction with respect to the latter. A second cam follower 23 on the other end of the transfer slide engages a ratio cam 28 which is affixed to an adjustable subslide 29 slidably mounted in the transverse slide 26. The position of the subslide 29 with respect to slide 26 is adjusted by means of nuts 30, 30' and lead screw 31 which is threaded into subslide 29 and passes through a hole in the side of slide 26. The initial position of the transverse slide 26 with respect to the slide 2 and base 1 in the Y-coordinate can thus be adjusted by moving the subslide 29 to the right or left, viewed in FIG. 3, by means of screws 30 and 30'. The subslide is then locked in position by tightening the outer nut 30' so that it is fixed with respect to the transverse slide 26. A hydraulic cylinder and piston rod (not shown) mounted between slides 2 and 26 maintains the ratio cam 28 and plate cam 8 in contact with the associated cam followers 23 and 19.

Rotation of plate cam 8 thus causes the transfer slide 18 to move in the X direction along rails 17. As the transfer slide moves toward or away from the transverse slide 26, follower 23 rides along the transfer cam 28 causing the transverse slide carrying the head assembly to move in the Y-coordinate to the left or right, as viewed in FIG. 3, depending on the direction of movement of slide 18.

The head assembly, generally indicated at 24 in FIG. 1, includes a housing 32 and a vertical shaft or spindle 33 suppported by bearings 34 and 35 mounted in the housing. As shown in FIGS. 2 and 3, the housing 32 is attached to a member 36 which is slidably supported for vertical movement by bearings 93 and 93' on frame 37 which in turn is affixed to the transverse slide 26. The movement of the slide member 36 carrying the head 24 in the vertical or Z direction is controlled by a hydraulic cylinder 38 (FIG. 3). The cylinder is attached to slide member 36 and its piston rod 38' bears against block 39 secured to the transverse slide 26. Upon activation of cylinder 38, the piston rod 38' pushes against block 39 and raises the slide member 36 until the latter abuts against a stop (not shown) on frame 37. Slide member 36 is lowered by deactivating the cylinder 38 so that the member 36, and the head 24 it supports, descend under their own weight against a second stop (not shown) on frame 37.

The third cam 9 on cam shaft 6 is used to rotate the shaft 33 in housing 32 and, hence, to rotate the tool holder 40 attached to the shaft. As shown in FIG. 1, cam 9 contacts a cam follower 41 mounted on one end of a short slide 42 supported on slide 2 for movement in the X direction, i.e. left to right as viewed in FIG. 1. Mounted on the other end of slide 42 is a roller 43 which bears against a bar 44 extending in the Y direction transversely of slide 2. The bar is attached to one end of a transfer slide 45 mounted on slide 26 for translational movement in the X direction. Attached to the opposite end of the transfer slide 45 is a ratio cam 46 which contacts a cam follower 47 on a vertical slide 48.

The vertical slide 48 is supported in the slide member 36 by bearings 49 and 49' (FIG. 2) so that it can move in the vertical or Z direction, as indicated by the double headed arrow in FIG. 1, with respect to member 36. A rack 50 attached to the upper end of the vertical slide 48 drives a pinion 51 secured to one end of a horizontal shaft 52. The horizontal shaft is supported by a pair of bearings 53 and 54 mounted in housing 32 and on its other end carries a beveled gear 55. The gear 55 meshes with a second bevel gear 56 on the vertical shaft 33.

Rotation of plate cam 9 thus causes the short slide 42 mounted on slide 2 to move in the X direction and impart a corresponding movement to the slide 45 which is mounted on the transverse slide 26. Since the roller 43 on slide 42 contacts an elongated bar 44 on slide 45, the bar and roller remain in engagement with each other despite movement of the transverse slide 26, and slide 45, which it carries, in the Y-coordinate. Movement of the slide 45 and the ratio cam 46, attached thereto, to the left or right, as viewed in FIG. 1, produces a corresponding downward or upward movement of the vertical slide 48 and rack 50. The vertical movement of rack 50 drives pinion 51 causing the horizontal shaft 52 and bevel gear 55 to rotate, which in turn rotates bevel gear 56 and the vertical shaft 33 carrying the tool holder 40. The cams and associated followers, as well as the roller 43 and bar 44, are maintained in engagement with each other by the weight of the vertical slide 48 so that movement of the slides and rotation of shaft 33 is precisely controlled by the contour of the cam 9. Backlash in the gear system is eliminated by a hydraulic device 57 which is mounted on top of housing 32 and is connected to the vertical shaft 33. The biasing device 57 is of known construction having a circular hydraulic cylinder in which hydraulic pressure is applied to one or the other side of the cylinder to rotationally bias the shaft in one or the other direction and eliminate backlash in the gear train.

A block 58 attached to the slide member 36 by means of a threaded rod 59 and nut 59' acts as a stop to prevent rotation of the vertical shaft 33, and the tool holder assembly 40 carried by the shaft, during vertical movement of the slide member. Thus when the hydraulic cylinder 38 is activated, the piston rod 38' pushes against block 39 causing the slide member 36 and the head assembly 24 carried by member 36, to slide upwardly in the frame 37. As the slide member 36 rises, block 58 abuts against the bottom of the vertical slide 48 and lifts it from ratio cam 46 and slide 45. Since the vertical slide 48 and slide member 36 move upwardly as a unit, there is no relative movement between the rack 50 on slide 48 and the pinion 51 on shaft 52 which would otherwise cause the vertical shaft 33 to rotate.

Figure 4:
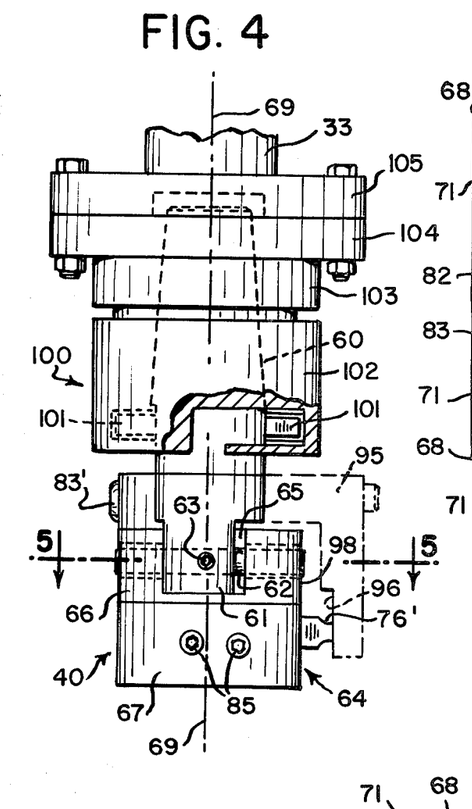
FIG. 4 is a schematic view of the tool holder of the invention.
Figure 5:
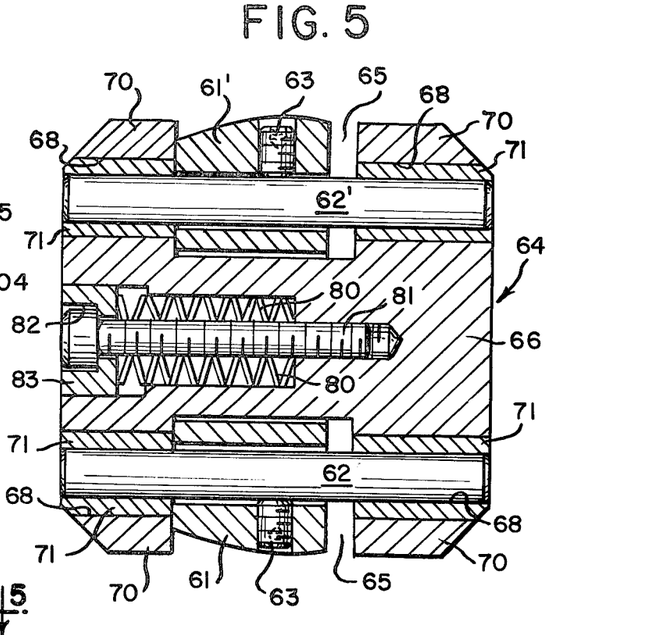
FIG. 5 is a cross-sectional view taken along lines 5—5 of FIG. 4.
Figures 6, 8A, 8B:
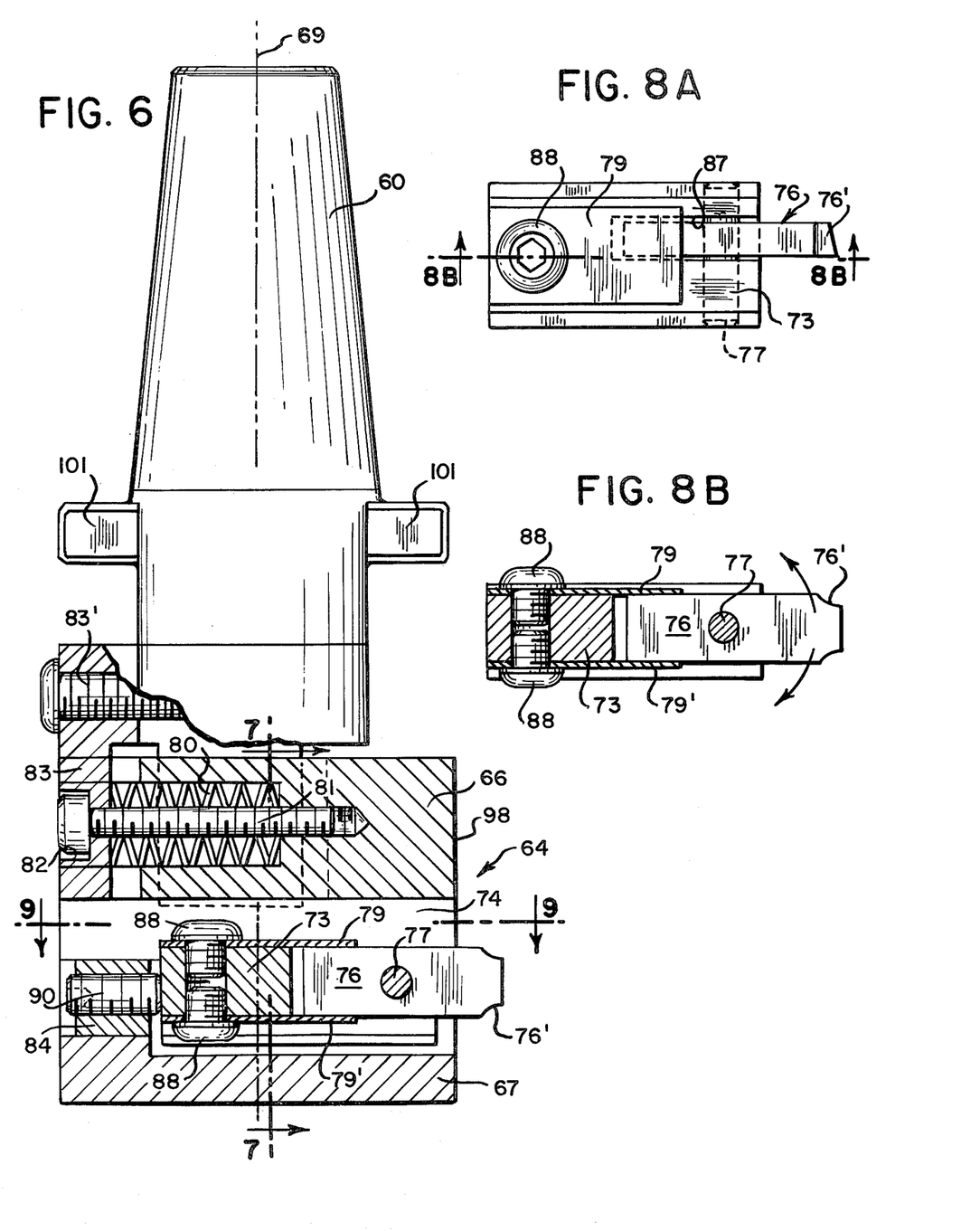
FIG. 6 is a partial cross-sectional view of the tool holder of the invention similar to FIG. 4 but at a larger scale.
FIG. 8A shows the mounting block of the invention for supporting the deburring tool.
FIG. 8B is a sectional view taken along lines 8B—8B of FIG. 8A.

The tool holder assembly 40 and the coupling for attaching it to the shaft or spindle 33 is shown in greater detail in FIGS. 4 to 9. Referring to FIGS. 4 and 6, the tool holder of the invention includes a tapered shank 60 terminating in a pair of spaced apart fingers 61 and 61', one of which is shown in FIG. 4. The two fingers carry a pair of parallel guide pins 62 and 62' which slidably support a carriage 64 for translational movement in a plane perpendicular to the shank axis 69. The carriage is formed by an upper member 66 and a base plate 67 attached to the bottom of member 66 by screws (not shown).

As best seen in FIG. 5, the two guide pins 62 extend through holes bored through the fingers 61 and 61' on shank 60, with the longitudinal axes of the pins extending perpendicularly to the shank axis 69. Each guide pin is retained in the associated finger by a set screw 63. The upper member 66 of carriage 64 is in the form of an H having four legs 70 with a hole 68 bored through each leg. The two fingers 61 and 61' each sit in the slot 65 between each pair of legs 70 on the two opposite sides of the H-shaped member 66. The guide pins each extend through bushings 71 in the bores 68 of two adjacent legs 70. The slots 65 between the legs 70 are wider than the fingers 61 and 61' permitting the carriage 64 to move on the guide pins 62 left to right as viewed in FIG. 5.

As shown in FIGS. 5 and 6, the carriage 64 is biased forwardly, i.e. to the right as viewed in the figures, by conical spring washers or Belleville springs 80 which bear against a plate 83 attached by bolts 83' to shank 60. The Belleville springs are mounted on a lead screw 81 which passes through a counter bored hole 82 in plate 83 and is threaded into the H-shaped member 66. In addition to supporting the Belleville springs, the lead screw 81 acts as a stop by limiting the forward movement of the carriage 64.

Figure 7:
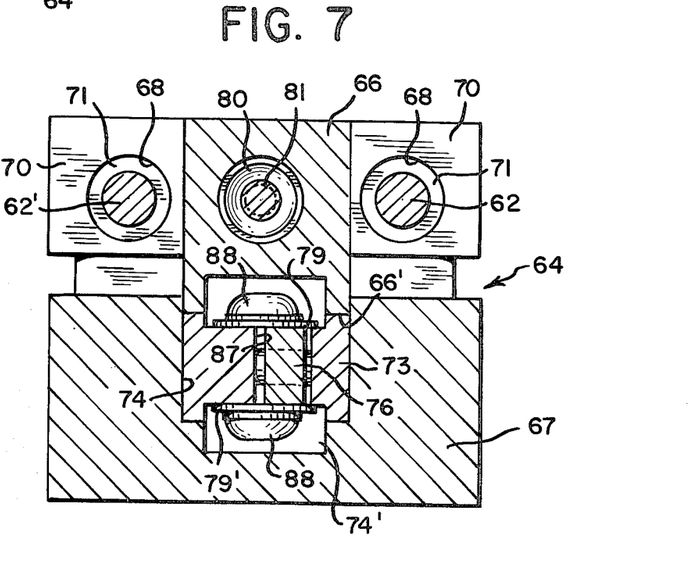
FIG. 7 is a cross-sectional view taken along lines 7—7 of FIG. 6.

Referring to FIGS. 6 and 7, the base plate 67 of carriage 64 has a slot 74 which forms with the bottom surface of member 66, a rectangular cavity 74'. Slidably seated in the cavity is a mounting block 73 which pivotally supports the cutting or scraping tool 76. The position of the mounting block 73 with respect to carriage 64 is adjusted by means of a set screw 90 threaded through a block 84 attached to the base plate 67. A pair of set screws 85 (FIG. 9) in tapped holes extending through the side of the base plate 67 lock the mounting block in place once it is located in the desired position.

Turning now to FIGS. 8A and 8B which show the mounting block in greater detail, the cutting tool 76 is positioned in a slot 87 formed in the block 73 and is pivotally supported on a pin 77 which extends transversely through the block. Affixed by screws 88 to the top and bottom surfaces of the mounting block are a pair of leaf springs 79 and 79'. The leaf springs are each seated in recesses milled in the mounting block so that they just touch the sides of the cutting tool and therefore centralize it even if the spring tensions are unequal while allowing the tool to pivot about the pin 77 under load.

As described earlier and shown in FIG. 6, the tool holder is assembled by inserting the mounting block and tool into the rectangular cavity 74' of carriage 64. The mounting block 73 is then locked in place by the two set screws 85 at a position such that the cutting tip 76' of the tool extends a predetermined distance beyond the front surface 98 of carriage 64. When removing burrs from a machined surface, for example, an oil groove 120 of a piston connecting rod shown in FIG. 9, the Belleville springs 80 bias the carriage 64 toward the groove and apply a cutting load to the tool 76. At the same time, since the carriage 64 supporting the tool is mounted on the shank 60 for movement in a plane perpendicular to the shank axis, i.e. in the plane of the groove 120, the tool can move in and out of the groove and follow the groove edges even though they may depart from their nominal location because of inaccuracies in the previous machining operations. Similarly, the pivotal mounting of the cutting tool permits it to move against the resistance of the two leaf springs 79 and 79' in the plane perpendicular to the plane of the groove and follow the groove edge even if its position varies in this plane.

The cutting load applied to the tool is determined by the biasing springs 80 and can be set to a desired value by choosing springs of appropriate stiffness. The cutting load can also be adjusted by moving the tool block 73 forward or backward with respect to the carriage 64 to respectively increase or decrease the load on the cutting tip. This is accomplished by loosening the two set screws 85 in the side of the carriage 64 and moving the block forward or backward in the rectangular cavity 74' by means of set screw 90. The position of the mounting block and tool may be initially set with a gauge block 95 shown in dot-dash lines in FIG. 4. The gauge block is bolted to shank 60 and is dimensioned so that with the carriage in its forward position, the lower inner surface 96 of block 95 is spaced from the front face 98 of the carriage 64 a distance equal to the distance the tip 76' of the tool should extend from the carriage to provide the desired cutting load. The mounting block is then moved forward by means of set screw 90 until the tip 76' of the tool just touches the inner surface of the gauge block. Once the position of the tool is set, the mounting block is locked in position by set screws 85 and the gauge block is removed from the shank.

As shown in FIGS. 1, 3 and 4, a quick disconnect coupler 100 is used to attach the tool holder assembly to the shaft or spindle 33. The coupler has an axially extending tapered opening configured to receive the tapered end of the shank 60 and the lugs 101 protruding from the shank. At the lower end of the coupler is a chuck 102 which is rotatable with respect to the coupler's upper portion 103 and has an internal helical groove adapted to receive the lugs 101. To attach the tool holder, the shank 60 is inserted into the coupler and the chuck is rotated while the tool holder is held stationary. As the chuck rotates, the lugs 101 ride upwardly along the helical groove and the shank 60 is forced tightly into the tapered axial opening in the coupler.

Referring to FIGS. 2 and 3, flange 104 on coupler 100 is bolted to a mating flange 105 on the lower end of spindle 33. A cylindrical projection 110 on the end of the coupler fits snugly into an axial bore in the end of the spindle 33 insuring that the axes of the shank 60 and the spindle are correctly aligned. A stop key 106 fits into a transverse groove formed in the upper surface of flange 104 of coupler 100 and extends into a slot between two ribs 107 on flange 105 of spindle 33. The flange 105 has slotted bolt holes so that the angular position of the tool holder 40 can be rapidly adjusted by rotating the coupler with respect to the spindle 33. Once the tool holder is properly located, set screws 111 in ribs 107 are tightened against the key 106 locking the coupling and tool holder in the desired position.

To use the apparatus of the invention for removing burrs from a previously machined work piece, the tool supporting head 24 of the apparatus is raised to its upper position by activating the hydraulic cylinder 38 and the work piece is clamped into position beneath the head on a work stand (not shown). The hydraulic cylinder is then deactivated and the head descends to its lower position under its own weight. With the head in its lower position, the cutting tool is oriented angularly and the head is moved in the X and Y coordinates by means of the subslides 13 and 29 until the cutting tip of the tool is aligned with the start of the groove, slot or other surface to be deburred.

Figure 9:
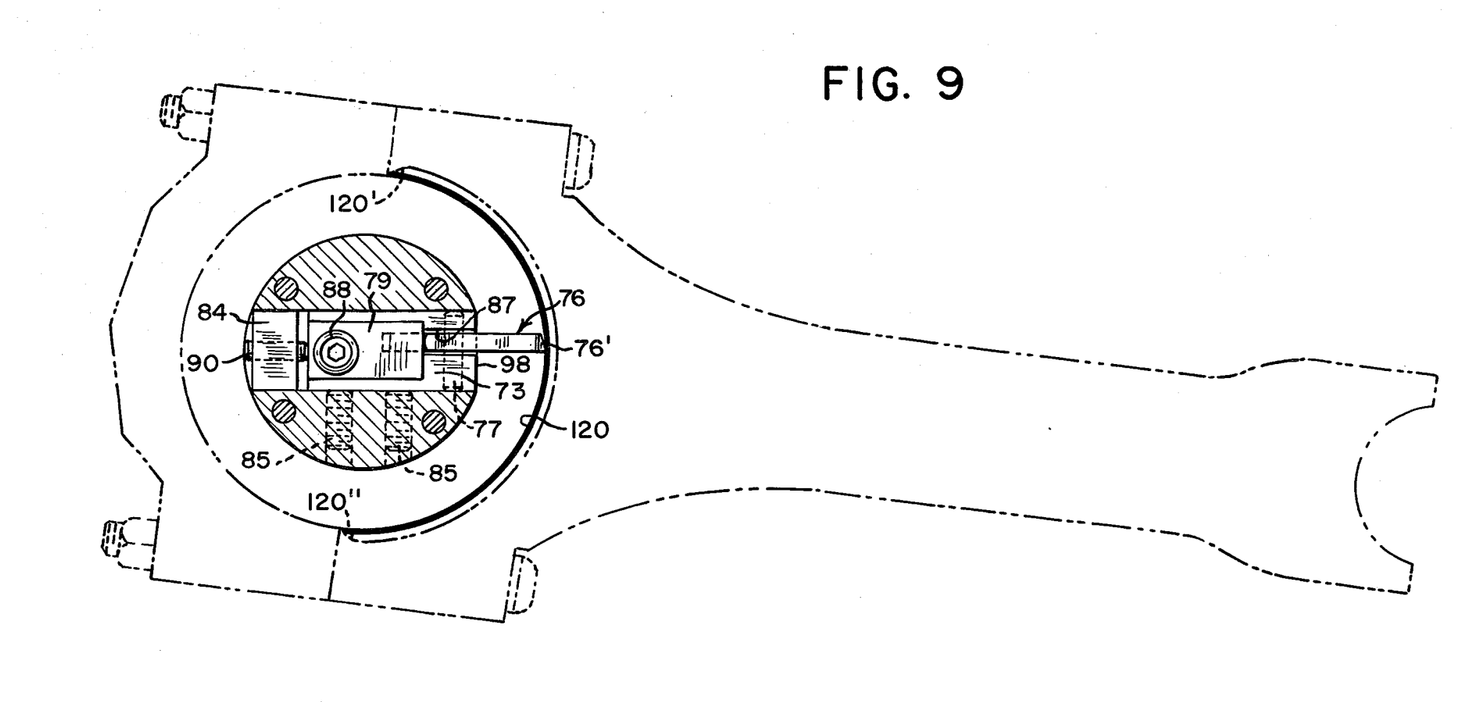
FIG. 9 is a sectional view taken along lines 9—9 of FIG. 7 showing the removal of burrs from the oil groove of a piston connecting rod.
Figures 10, 11, 12:
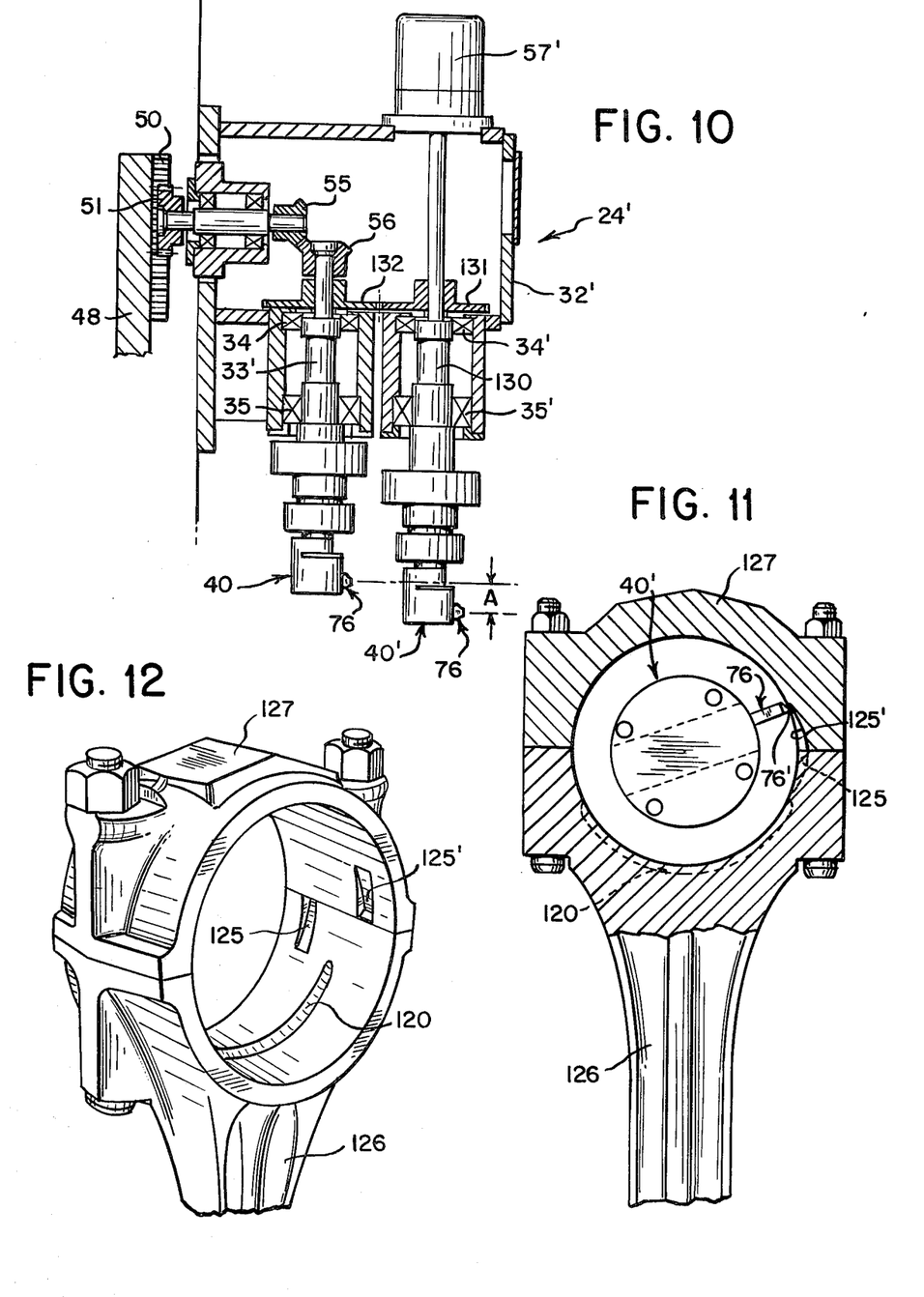
FIG. 10 is a cross-sectional view of a portion of an alternative embodiment of the deburring apparatus of the invention.
FIG. 11 is a partial cross-sectional view of the embodiment of FIG. 10 showing the removal of burrs from keeper slots in a piston connecting rod.
FIG. 12 is a perspective view of a piston connecting rod showing the keeper slots and oil groove.

For example, when the apparatus is used to remove burrs from an oil groove 120 of a piston connecting rod such as that shown in FIGS. 9 and 12, the angular position of tool 76 is initially adjusted so that its cutting tip is adjacent either the end 120' or end 120" of the groove, depending on the direction of rotation of the spindle 33. As described earlier, this is accomplished by loosening the two set screws 111 on flange 105 of spindle 33, rotating the coupling 100 and tool holder with respect to the spindle until the tool 76 is properly oriented and locking the coupling in that position by retightening the set screws. The head is then moved in the X and Y directions by an appropriate adjustment of the subslides 13 and 29, as described previously, until the cutting tip 76' of the tools enters the start of the groove 120.

When the tool 76 is properly positioned with respect to the work piece, the drive motor 10 is energized and rotates the cam shaft 6 carrying the three plate cams 7, 8 and 9. As cam 7 rotates, it bears against follower 11 on subslide 13, which is fixed with respect to base 1, causing slide 2 to move in the X-coordinate in a manner determined by the contour of the plate cam. At the same time, rotation of cam 8 causes the transfer slide 18 to move in the X direction and drive the transverse slide 26 in the Y-coordinate by means of follower 23 and ratio cam 28. The movement of the transverse slide 26, and head 24 carried by the slide, in the Y-coordinate is thus determined by the contour of plate cam 8 and the transfer angle of the ratio cam 28. The path of the cutting tool mounted on the head 24 in the X-Y plane is thus defined by the contours of the two plate cams 6 and 7 and the transfer angle of ratio cam 28 and can be varied by changing the shapes of the cams to follow the contour of the particular surface to be deburred.

As described earlier, the third plate cam, cam 9, is used to rotate the spindle 33 carrying the tool holder 40. The cam contacts follower 41 on slide 42, which drives slide 45 supported on the transverse slide 26 by means of roller 43 and bar 44. The ratio cam 46, on slide 45 in turn contacts follower 47 on the vertical slide 48 and drives the latter. Rotation of cam 9 thus imparts horizontal movements to slides 42 and 45 which is converted to a vertical movement of slide 48 by the ratio cam 46, causing the rack 50 on slide 48 to drive the gear train, comprised of pinion 51 and bevel gears 55 and 56, and rotate spindle 33.

In the case of the connecting rod shown in FIG. 9, the contours of the two cam plates 7 and 8 and the ratio cam 28 are designed to move the head and cutting tool along a path in the X-Y plane corresponding to the nominal outline of the semi-circular oil groove 120. Cam 9, controlling the rotation of the spindle 33, on the other hand, has a contour designed to rotate the tool at a rate such that the proper cutting angle is maintained between the tool and the edges of the groove during the movement of the tool along the path defined by the contours of the two plate cams 7 and 8. Thus, as the tool moves along the groove under the influence of the rotating cams 7 and 8, it also rotates about an axis normal to the X-Y plane at a rate such that the cutting tip is always inclined at the proper angle with respect to the surface being deburred.

As mentioned previously, the cutting tool is mounted in a carriage 64 which is slidably supported on the two guide pins 62 carried by shank 60 for movement in the X-Y or horizontal plane. The Belleville springs 80 bias the carriage toward the surface being deburred and apply a load to the cutting tool sufficient to remove the burrs without damage to the adjacent surface. Since the carriage is biased toward the surface being deburred and can move backwards against the springs, the cutting tool 76 is able to follow the groove, slot or other cut despite variations of the edge being deburred from its nominal position in the X-Y or horizontal plane. Moreover, since the cutting tool can pivot up and down about pin 77 from its central position against the leaf springs 79, it can also follow deviations of the cut from its nominal position in the vertical plane and is returned to its central position by the leaf springs once the displacing force ceases.

The floating mounting arrangement, which permits the cutting tool to move in two orthogonal planes, thus enable the tool to automatically follow the edge being deburred despite relatively large departures of the cut from its intended location due to inaccuracies in the previous machining operations. For that reason, it is not necessary for the path traversed by the tool head of the deburring apparatus to correspond exactly to the actual contour of the edge being deburred for each article. Instead, the cams controlling the movement of the head can be fabricated to move the head along a path corresponding to the nominal contour of the edge to be deburred for an article of a given design since the cutting tool itself can sense the actual location of the cut and follow it even if the cut departs from the intended position.

FIGS. 10 and 11 show another embodiment of the invention which is generally the same as that of FIGS. 1 to 8 except for the dual spindle arrangement. Accordingly, like parts are designated by like reference characters while similar parts having identical functions are designated by the same reference character as used in FIGS. 1 to 8 followed by the suffix prime.

The cam driven slide machanism for supporting the tool head 24' of the embodiment shown in FIG. 10 may be identical to that described with reference to FIGS. 1 to 3. The tool head supports a pair of rotatable spindles 33' and 130 each carrying a tool holder 40 and 40', respectively, of the same construction as described with reference to FIGS. 4 to 8. Spindle 33' is rotationally driven by a rack 50, pinion 51 and bevel gears 55 and 56 which are identical in operation to the corresponding elements of the embodiments of FIGS. 1 to 3. The second spindle 130 is supported by bearings 34' and 35' mounted in housing 32' and extends downwardly from the head to a point below the lower end of spindle 33'. Affixed to spindle 130 is a gear 131 which meshes with another gear 132 affixed to spindle 33'. Thus as the spindle 33' is rotationally driven in one direction by the rack 50 and gears 51, 55 and 56, the gear train formed by gears 132 and 131 in turn rotates spindle 130 in the opposite direction. A hydraulic device 57' connected to spindle 130 rotationally biases the spindle in one direction and eliminates backlash in the gear train in the same manner as the corresponding device described with reference to the embodiment of FIGS. 1 to 3.

Since the two spindles 33' and 130 rotate in opposite directions, the apparatus can be used to deburr cuts such as the keeper slots 125 and 125' of the connecting rod shown in FIG. 12. The keeper slots, which prevent the journal bearing from rotating in the bore when the connecting rod is assembled, are spaced apart vertically and are cut in the cylindrical wall of the connecting rod 126 proper and cap 127, respectively. The two slots are arcuate cuts in the wall of the bore whose depth increases in the clockwise and counterclockwise directions, respectively, and which terminate at the junction of the connecting rod and cap.

When deburring the keeper slots, the lengths of the two spindles 33' and 130 are chosen such that the cutting tools 76 supported by the respective tool holders 40 and 40' are spaced vertically a distance A equal to the vertical spacing of the keeper slots 125 and 125'. The connecting rod is then clamped to a work stand (not shown) and positioned beneath spindle 130. The tool holder 40' is inserted into the bore of the connecting rod as shown in FIG. 11, by lowering the head and the head is moved in the horizontal plane by adjustments of the subslides until the cutting tip of the tool 76 enters the start of slot 125'.

Once the tool is properly positioned, the motor driving the cam shaft is energized and the tool moves along the slot 125' removing the burrs from its edges as the head is moved in the X and Y coordinates by the respective slides and associated cams. At the same time the spindle 130 is rotated in a clockwise direction, as viewed in FIG. 11, by the rack 50 and the gear train formed by pinion 51 and gears 55, 56, 132 and 136 so that the cutting angle between the tool and the edge of the groove remains fixed during the deburring operation. Once slot 125' is deburred, the head 130 is raised and the connecting rod is positioned beneath spindle 33'. The head is then lowered and the tool 76 carried by spindle 33' is positioned in the second slot 125. Once the tool is properly positioned in the slot, the deburring operation is repeated with the spindle 33' and the tool 76 being rotated in a counterclockwise direction during the removal of the burr from the edges of slot 125.

Although in the embodiments described above the apparatus of the invention is used to remove burrs from grooves or slots which extend in the horizontal plane, by controlling the vertical movement of the tool carrying head the apparatus can also be used to deburr cuts which extend in both the vertical and the horizontal planes. This may be accomplished by removing the rack, pinions and beveled gears used to rotate the spindle of the embodiment shown in FIGS. 1 to 3 and driving the spindle by a motor mounted on the head. In such a construction plate cam 9 and associated slides 42 and 45 are then used to move the slide member 36 carrying the head 24 in the vertical direction. This arrangement thus permits the movement of the head and hence the tool to be controlled by the cams in all three orthogonal coordinates so that the tool can move in the horizontal and vertical planes along a path corresponding to the contour of the edge to be deburred. Alternatively the head may be moved in the vertical or Z-coordinate by additional slides similar to slides 42 and 45 so that both the vertical movement and rotation of the head is controlled by plate cams attached to the cam shaft 6.

I claim:

1. An apparatus for removing machining burrs from a work piece by a deburring tool, said apparatus comprising:
   (a) a base;
   (b) a housing;
   (c) means for mounting said housing on said base for movement with respect thereto;
   (d) a tool holder;
   (e) means for attaching said holder to said housing for movement therewith;
   (f) means for mounting the deburring tool on said holder for movement therewith and for movement with respect thereto;
   (g) a tool mounted by said last-named mounting means for translational movement with respect to said holder in one plane and for movement with respect to said holder in a second plane normal to said one plane;
   (h) means for resiliently biasing the tool outwardly from said holder in a direction parallel to the direction of translational movement in said one plane;
   (i) means for imparting a predetermined movement to said housing; and
   (j) means for resiliently maintaining the tool in a predetermined position with respect to said holder in said second plane.

2. An apparatus according to claim 1 wherein:
   a. said holder includes a support member attached to said housing by said attaching means;
   b. said last-named mounting means includes a movable member mounted on said support member for translational movement with respect thereto in said one plane, the tool being supported on said movable member for movement therewith and for movement in said second plane with respect thereto; and
   c. said biasing means includes a spring engaged between said support member and said movable member.

3. An apparatus according to claim 2 wherein said tool is supported on said movable member for pivoting in said second plane about an axis fixed with respect to said movable member.

4. An apparatus for removing machining burrs from work piece, said apparatus comprising:
   a. a base;
   b. a housing;
   c. means for mounting said housing on said base for translational movement in at least two orthogonal directions defining a first plane;
   d. a tool holder including:
      i. a deburring tool;
      ii. a support member;
      iii. means for supporting said tool on said support member for movement with respect thereto; and
      iv. means for resiliently biasing said tool outwardly from said support member;
   e. means for attaching said support member to said housing for movement therewith; and
   f. means for moving said housing along a predetermined path in said first plane.

5. An apparatus according to claim 4 wherein said means for mounting said housing includes:
   a. a first slide supported on said base for translational movement with respect thereto in a direction parallel to one of said two orthogonal directions;
   b. a second slide supported on said first slide for translational movement with respect thereto in a direction parallel to the other of said two orthogonal directions; and
   c. means for supporting said housing on said second slide for movement therewith.

6. An apparatus according to claim 5 wherein said means for moving said housing includes cam means for imparting a predetermined movement to each of said slides.

7. An apparatus according to claim 5 wherein said means for moving said housing includes:
   a. a third slide supported on said first slide for movement with respect thereto in a direction parallel to said one direction toward and away from said second slide;
   b. a cam follower mounted on one of said second and third slides;
   c. cam means mounted on the other of said second and third slides in engagement with said cam follower for moving said second slide upon movement of said third slide;
   d. an additional cam follower mounted on each of said third slide and base;
   e. a rotatable cam shaft mounted on said first slide;
   f. a cam member in engagement with each of said additional cam followers for controlling the movement of each of said first and third slides, said cam members being affixed to said cam shaft; and
   g. means for rotating said cam shaft.

8. An apparatus for removing machining burrs from a work piece, said apparatus comprising:
   (a) a base;
   (b) a housing;
   (c) means for mounting said housing on said base for movement with respect thereto;
   (d) a rotatable shaft mounting in said housing for movement therewith;
   (e) a tool holder including:
      (i) a support member,
      (ii) a deburring tool,
      (iii) means for mounting said tool on said support member for movement with respect thereto, and
      (iv) resilient means arranged on said support member for urging said tool outwardly from said support member;
   (f) means for demountably attaching said support member to said shaft for movement therewith;
   (g) means for moving said housing; and
   (h) means for rotating said shaft and including:
      (i) a slide supported on said base for translational movement with respect thereto,
      (ii) a rack attached to said slide for movement therewith,
      (iii) gear means in engagement with said rack for driving said shaft in rotation upon translational movement of said slide,
      (iv) a cam follower mounted on said slide, and
      (v) a cam member in engagement with said follower for imparting a predetermined movement to said slide.

9. An apparatus according to claim 8 wherein said housing is mounted on said base for translational movement in at least two orthogonal directions defining a first plane.

10. An apparatus according to claim 9 wherein said shaft is rotatable about an axis normal to said first plane.

11. An apparatus according to claim 10 wherein said housing is mounted on said base for translational movement in a third direction normal to said first plane.

12. An apparatus according to claim 11 wherein said means for mounting said housing includes:
   a. a second slide supported on said base for translational movement with respect thereto in a direction parallel to one of said two orthogonal directions;
   b. a third slide supported on said second slide for translational movement with respect thereto in a direction parallel to the other of said two orthogonal directions;
   c. frame means mounted on said third slide for movement therewith;
   d. means for supporting said housing on said frame means for movement therewith and for movement with respect thereto in said third direction; and
   e. wherein said means for moving said housing includes cam means for imparting a predetermined movement to each of said second and third slides and further means for moving said housing in said third direction.

13. An apparatus according to claim 12 wherein:
   a. said means for supporting said housing on said frame means includes a movable member mounted on said frame means for translational movement in said third direction with respect thereto, said housing being attached to said movable member for movement therewith;
   b. said first-named slide is mounted on said movable member for translational movement with respect thereto; and
   c. said means for rotating said shaft further includes:
      i. a fourth slide supported on said third slide for movement with respect thereto, said cam member being mounted on said fourth slide; and
      ii. further cam means for imparting a predetermined movement to said fourth slide.

14. An apparatus according to claim 13 including means for preventing rotation of said shaft during movement of said housing in said third direction.

15. An apparatus for removing burrs from the edge of a cut such as a groove or slot in the surface of a work piece, said apparatus comprising:

a. a base;
b. a housing;
c. means for mounting said housing on said base for movement in at least two orthogonal directions defining a first plane;
d. a shaft mounted in said housing for movement therewith and for rotation about an axis normal to said first plane;
e. a tool holder including:
   i. a support member;
   ii. a deburring tool;
   iii. means for mounting said tool on said support member for movement with respect thereto toward and away from said edge; and
   iv. means for resiliently urging said tool toward said edge;
f. means for attaching said support member to said shaft for movement therewith;
j. means for moving said housing along a path corresponding to the contour of said edge; and
k. means for rotating said shaft at a rate such that a predetermined angle is maintained between said tool and said edge as said housing moves along said path.

16. An apparatus according to claim 15 wherein:
a. said means for mounting said tool includes:
   i. a carriage supported on said support member for translational movement with respect thereto in a second plane; and
   ii. means for supporting said tool on said carriage for movement therewith; and
b. said resilient means includes a spring engaged between said carriage and said support member.

17. An apparatus according to claim 16 wherein:
a. said tool is supported on said carriage by said supporting means for movement with respect thereto in a third plane normal to said second plane; and
b. said tool holder includes second resilient means for maintaining said tool in a predetermined position in said third plane.

18. An apparatus according to claim 17 wherein:
a. said tool is elongated and has a burr removing tip on one end, said tool being supported on said carriage for pivoting about an axis normal to said third plane and fixed with respect to said carriage, and
b. said second resilient means is arranged to maintain said tool in a position such that said tip thereof lies in said second plane.

19. An apparatus according to claim 18 wherein:
a. said means for supporting said tool includes:
   i. a mounting block supported by said movable member for movement therewith, said block having a slot formed therethrough; and
   ii. a pin mounted in said block and extending transversely through said slot, the longitudinal axis of said pin being perpendicular to said third plane and forming said fixed axis, said tool being mounted in said slot for pivoting about said pin in said third plane; and
b. said second resilient means includes a pair of springs each affixed to one of two opposite sides of said block and engaging one of two opposite sides of said tool.

20. An apparatus according to claim 18 wherein:
(a) said mounting block is supported on said carriage for movement with respect thereto; and
(b) said tool holder includes means for locking said block in a predetermining position with respect to said carriage.

21. An apparatus for removing machining burrs from a work piece, said apparatus comprising:
(a) a base;
(b) a housing;
(c) means for mounting said housing on said base for movement with respect thereto;
(d) a pair of rotatable shafts mounted in said housing for movement therewith;
(e) a pair of tool holders each having:
   (i) a support member,
   (ii) a deburring tool,
   (iii) means for mounting said tool on said support member for movement with respect thereto, and
   (iv) resilient means arranged on said support member for urgining said tool outwardly from said support member;
(f) means for attaching said support member of each of said holders to one of said shafts for movement therewith;
(g) means for moving said head; and
(h) means for rotating each of said shafts in opposite directions and including:
   (i) a slide supported on said base for translational movement with respect thereto,
   (ii) a rack coupled to said slide for movement with respect to said housing upon movement of said slide,
   (iii) gear means mounted in said housing and engaging said rack for rotating said shafts in opposite directions upon movement of said rack, and
   (iv) cam means for imparting a predetermined movement to said slide.

22. A tool holder for a deburring apparatus having a tool supporting head, said tool holder comprising:
(a) a support member adapted to be demountably attached to the head;
(b) a deburring tool;
(c) means for mounting said tool on said support member for movement with respect thereto, said means including a carriage supported on said support member for translational movement with respect thereto in a first plane, said tool being mounted on said carriage for movement therewith; and
(d) resilient means including a spring engaged between said carriage and said support member for urging said tool outwardly from said support member.

23. A tool holder according to claim 22 wherein said mounting means includes a pair of guide pins attached to said support member, said carriage being slidably supported on said pins for movement in said one plane.

24. A tool holder according to claim 22 wherein:
a. said tool is mounted on said carriage for movement with respect thereto in a second plane normal to said first plane; and
b. said tool holder includes second resilient means for maintaining said tool in a predetermined position in said second plane.

25. A tool holder according to claim 24 wherein:
a. said tool is elongated and has a burr removing tip on one end, said tool being mounted on said carriage for pivoting about an axis normal to said second plane and fixed with respect to said carriage, and b. said second resilient means is arranged to maintain said tool in a position such that said tip thereof lies in said first plane.

26. An apparatus according to claim 25 wherein:
 a. said means for mounting said tool includes:
  i. a mounting block supported on said carriage for movement therewith, said block having a slot formed therethrough; and
  ii. a pin mounted in said block and extending transversely through said slot, the longitudinal axis of said pin being perpendicular to said second plane and forming said fixed axis, said tool being mounted on said slot for pivoting about said pin in said second plane; and
 b. said second resilient means includes a pair of springs each affixed to one of two opposite sides of said block and engaging one of two opposite sides of said tool.

27. An apparatus according to claim 26 wherein:
 a. said mounting block is supported on said carriage for movement with respect thereto in a direction parallel to the direction of the translational movement of said carriage; and
 b. said tool holder includes means for locking said block in a predetermined position with respect to said carriage.

* * * * *